March 17, 1964  O. H. STOHLDRIER  3,124,956
PURGELESS FLOW METER

Filed Feb. 8, 1961  2 Sheets-Sheet 1

INVENTOR
Oliver H. Stohldrier
BY
*H. L. Gammons*
AGENT

March 17, 1964   O. H. STOHLDRIER   3,124,956
PURGELESS FLOW METER
Filed Feb. 8, 1961   2 Sheets-Sheet 2

INVENTOR
Oliver H. Stohldrier
BY
AGENT

United States Patent Office 3,124,956
Patented Mar. 17, 1964

3,124,956
PURGELESS FLOW METER
Oliver H. Stohldrier, Webster Groves, Mo., assignor to National Lead Company, New York, N.Y., a corporation of New Jersey
Filed Feb. 8, 1961, Ser. No. 87,858
2 Claims. (Cl. 73—211)

The present invention relates in general to flow meters for measuring the flow of fluids in a pipe line and more particularly to a purgeless differential pressure metering unit for measuring the flow of corrosive and solids-laden liquids in a pipe line.

Although there are many types of meters available for measuring the flow rate of chemically inert liquids the choice of suitable metering devices narrows considerably when corrosive liquids or liquids carrying a high percentage of abrasive solids are to be measured.

One of the more economical commercially available meters for measuring the flow rate of corrosive liquids and solids-laden liquids in a pipe line is referred to in the art as an orifice-type meter wherein a plate having an orifice of standard diameter is inserted in the pipe line to create a difference in pressure on opposite sides respectively of the orificed plate, the pressure difference being measured by a meter having tubular connections to suitable pipe taps in the pipe line on opposite sides respectively of the orificed plate. The recorded pressure differential is converted by the meter into a value representative of the existing flow rate in the pipe line.

In measuring the flow of corrosive liquids or liquids carrying a large volume of solids it is standard practice to introduce water, in equal amounts into the tubular connections leading from the meter to the pipe line to repel intrusion of the corrosive liquids or solids to the meter so as to prevent impairment of metering accuracy—and/or complete destruction of the meter. This is sometimes referred to in the art as a water-purge type pressure differential metering system. As long as the pressures in the pipe line and in the purge water lines do not change abnormally, this type of system is reasonably satisfactory. However, when surges in pressure occur in the pipe line and in the water-purge lines, meter readings become inaccurate and the meter soon rendered inoperative. Experience in plant installations has shown that such failures may occur as often as once a week as a consequence of which unconscionable expenditures in time and money are required to keep the meter system in operation—not to mention the losses due to down-time and impairment of the quality of the product being produced.

There has been a need, therefore, for pressure differential measuring means adapted for measuring the flow of corrosive and solids-laden fluids in a pipe line without the disadvantages that attend the use of a water-purging system.

An object, therefore, of the instant invention is to provide a purgeless pressure differential measuring system for measuring the flow of liquids in a pipe line.

A further object of the invention is to provide an improved purgeless pressure differential measuring device in the form of a sealed integrated unit for measuring the flow of liquids in a pipe line.

Another object of the invention is to provide an improved purgeless pressure differential measuring device wherein a pressure differential measuring cell and sealed fluid pressure responsive means are integrated to form a single unit.

Another object of the invention is to provide an improved sealed pressure differential measuring unit which, prior to connecting in a pipe line, may be readily manipulated so as to be filled with a pressure transmitting fluid free of air or air pockets.

With the above and other objects in view, as will appear to those skilled in the art from the present disclosure, the invention includes all features in the disclosure which are novel over the prior art and which are not claimed in any separate application.

In the accompanying drawings in which certain modes of carrying out the invention are shown for illustrative purposes:

Figure 2:
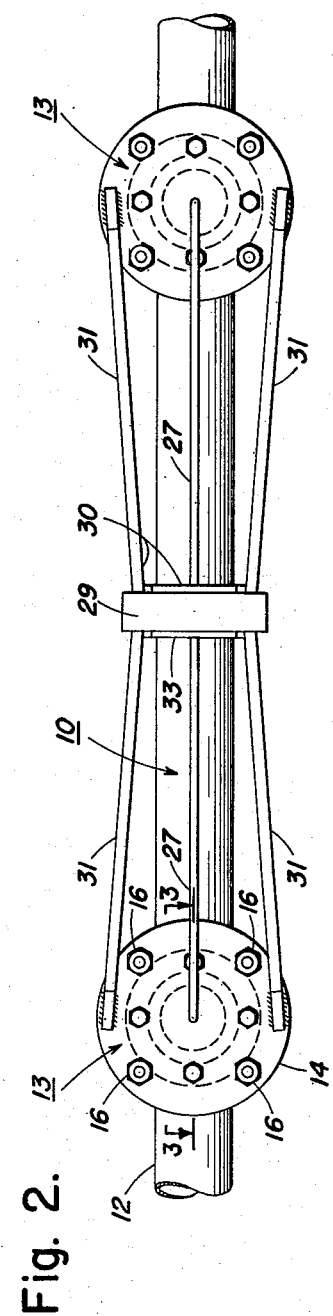
FIG. 2 is a plan elevation of the unit in the direction of the arrows 2—2 of FIG. 1.

Broadly, the invention relates to a sealed differential pressure metering unit for measuring the pressure of a fluid in a pipe line. More especially the unit of this invention comprises a differential pressure measuring cell of a type commonly used in industry, typical cells being one known as the Foxboro Model 3A d/P cell, or the Transaire Differential Transmitter 333R (Taylor Instrument Company, Rochester (1), New York)—having tubular members, i.e. tubing of copper or other corrosion resistant material, connecting opposite sides of the cell to sealed fluid pressure responsive means adapted to be detachably mounted on pipe taps of a pipe line in which the flow of liquid is to be measured, and a rigid frame to which the cell and the respective sealed fluid pressure responsive means are permanently fastened to form an integrated unit.

In its inception the invention was based on the concept of utilizing sealed fluid pressure responsive means including filler pipes at each pipe tap in lieu of open water-purged pipes. This departure from a water purged system necessitated using a differential pressure cell of the above mentioned Foxboro or Taylor type, sometimes designated hereinafter as a d/P cell, which works on a force balance principle wherein an air relay is used to resist displacement of the fluid, and diaphragm, in the sealed pressure responsive means. Thus the air pressure required to resist this displacement is proportional to the unbalanced pressure acting on the sealed pressure responsive means and hence is a measure of the pressure differential between the respective pipe taps of the pipe line at any given moment.

Early experiments with an assembly of this type quickly revealed that the threaded pipe joints and the low surface tension of the fluid (50–50 water glycerine mixture) used in the system gave rise to severe problems of leakage so much so that the readings of the d/P cell bore no relation to the actual flow rate of fluid in the pipe line. To overcome these difficulties copper tubing with soldered fittings was used to connect the sealed pressure responsive means to the d/P cell, and ordinary brake fluid was substituted for the glycerine-water mixture in the sealed system. However, despite these attempts to assure a sealed air-free system the d/P cell invariably remained sensitive to static pressure variations in the pipe line indicating the persistent presence of a cushion of air in the sealed system.

The perfection and immediate success of the instant invention lie in the discovery that by eliminating the filler pipes of the sealed pressure responsive means and connecting the latter to the d/P cell by means of a rigid frame to form an integrated unit, the latter could be readily manipulated so as to fill and seal the pressure transmitting system, i.e. the sealed pressure responsive means and the d/P cell with a fluid, without having an air pocket or cushion of air in the system the entire unit being readily assembled on or removed from the pipe taps of a pipe line simply and with dispatch.

Turning now to the drawing the numeral 10 denotes a pipe line through which a caustic or solids-laden liquid flows. An orificed plate of standard design, indicated generally at 11, is assembled in the pipe line transversely of its longitudinal axis to create a pressure difference in the pipe line on opposite sides of the plate. The pipe taps of the pipe line are indicated at 12—12 and are located on opposite sides respectively of the orificed plate 11 and at distances therefrom dictated by pipe tap flow metering specifications which locate one pipe tap 2½ pipe diameters up stream and the other pipe tap 8 pipe diameters downstream of the orificed plate measured on centers.

In as much as the pipe taps 12—12 and their respective sealed pressure detecting means 13—13 are identical, it will simplify the description to make specific reference to one only of these assemblies.

Figure 3:
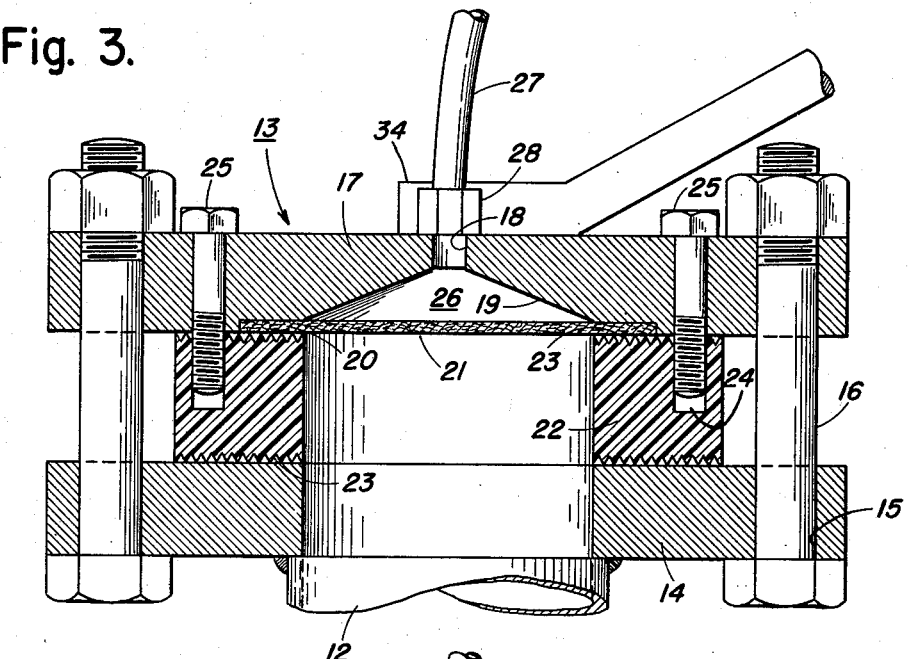
FIG. 3 is an enlarged elevation in section of one of the fluid pressure responsive means of the unit on line 3—3 of FIG. 2.

Referring to FIG. 3 the pipe tap 12 is provided at its upper end with a metal flange 14 which may be formed integrally thereon or comprise an annulus welded to the end of the pipe tap. The flange 14 may be disc shaped as shown in FIG. 2 and is provided with a plurality of bolt holes 15, four being shown in the present embodiment, to accommodate fasting means, i.e. bolts 16 for detachably mounting the sealed pressure responsive means 13 to the pipe tap flange 14.

Referring again to FIG. 3 the sealed pressure responsive means 13 comprises a metal plate or cap 17 corresponding in dimensions to the pipe tap flange 14 and provided with bolt holes to receive bolts 16. An aperture 18 is centered in the cap 17 and extends therethrough to the underside thereof where the diameter of the aperture is enlarged by a countersink to form a shallow conical recess 19 in the underside of the cap, the maximum diameter of the conical recess corresponding substantially to the inside diameter of the pipe tap 12. The conical recess 19 has, at its periphery, an annular recess 20 which is concentric with the conical recess 19 and of larger diameter to provide an annular seat on which to rest the edge of a flexible disc-shaped diaphragm 21. In order that the meter may be applicable to variable conditions the diaphragm material is selected to resist temperature changes and acids and to have good strength characteristics, a preferred material of the diaphragm being a plastic such as neoprene, Teflon or an equivalent plastic material having a maximum thickness of 0.020" and a preferred thickness of 0.0025".

The flexible diaphragm is adapted to be secured on the annular seat 20 with a fluid-tight seal and to this end a retaining member 22 is provided in the form of a ring or annulus formed of a corrosive resistant material such as Lucite (polymerized methyl methacrylate) polyvinyl chloride, or an equivalent plastic material. The inside diameter of the annulus 22 corresponds substantially to the inside diameter of the pipe tap while its outside diameter is such that its periphery will lie inside the locus of the bolts 16 used to secure the cap 17 of the sealed pressure responsive means 13 to the pipe tap flange 14.

As shown especially well in FIG. 3 each face of the diaphragm retaining annulus is scored with V grooves as indicated as 23, which were found to be essential for insuring a fluid tight seal between the diaphragm and its retaining ring, and between the retaining ring and the pipe tap flange 14. As shown in the drawings the diaphragm retaining ring is also provided with a plurality of internally threaded holes 24 located at substantially equally spaced points around its periphery to accommodate bolts 25 in the axially aligned holes of the cap 17. With the diaphragm 21 seated in the annular recess 20 the diaphragm retaining ring 22 is secured to the underside of the cap 17 by bolts 25 which serve to draw the grooved face of the retaining ring in sealing engagement with the diaphragm thereby forming a fluid tight seal between the cap and the diaphragm and between the diaphragm and its retaining ring—the diaphragm, in conjunction with the conical recess 19 forming a sealed fluid tight chamber 26.

The latter assembly, i.e. cap 17, the diaphragm 21 and the diaphragm retaining ring 22, as thus constructed, form an integrated assembly adapted, by means of the bolts 16, to be detachably mounted on or removed from the pipe tap flange 14 simply and with dispatch.

Referring again to FIG. 3 each aperture 18 of the cap 17 is adapted to accommodate one end of a tubular member 27, preferably a length of copper tubing, which is permanently secured in the aperture 18 by means of suitable pipe fittings, indicated generally at 28, the latter being tinned or otherwise constructed to form a permanent fluid tight connection between the end of the copper tubing and the cap 17 of the pressure responsive means 13.

Figure 1:
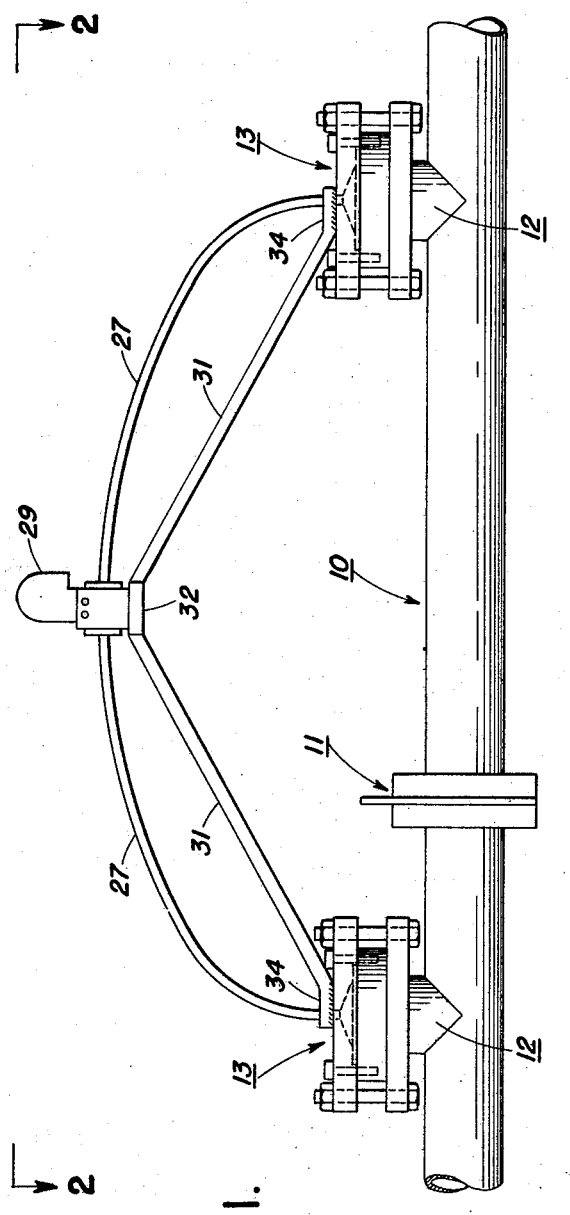
FIG. 1 is a side elevation of the purgeless pressure differential metering unit of this invention mounted on the pipe taps of a pipe line.

The opposite end of the copper tubing 27 is connected with a similar type of permanent connection to one side of the d/P cell 29. The opposite side of the cell is similarly connected, see FIGS. 1 and 2, by a length of copper tubing 27, to the second sealed pressure responsive means 13.

As mentioned at the outset, heretofore, the major difficulties with d/P type metering devices has been leakage and/or the presence of air or air pockets in the metering system. In addition to the features described above which relate to a fluid tight system that will remain free from leakage over extended periods of time, the present invention is further characterized by a rigid H-shaped frame, see FIG. 2, to which the sealed pressure responsive means 13—13, and the d/P cell 29 are connected to form an integrated unit. The H-shaped frame is indicated generally at 30 and in the present embodiment of the invention comprises a pair of stiff rods 31—31, preferably formed of aluminum for the sake of lightness, although other metals such as steel or brass may be used, each rod being bent in the shape in an inverted V, see FIG. 1, with a flat portion 32 at the apex of the V. The two rods are arranged in substantially parallel relationship, as shown in FIG. 2, and are connected at their mid points, corresponding to the flat portions 32—32 by a substantially rectangular metal plate 33, preferably formed of aluminum, which extends transversely of the longitudinal axes of the rods and is fastened by welding or equivalent means at its outboard ends respectively to the corresponding flat portions 32—32 of the rods. The metal plate 33 constitutes a support or base to which the d/P cell 29 is permanently fastened by bolts or equivalent fastening means.

The outer ends of the pair of rods are adapted to be permanently secured to the respective sealed pressure responsive means 13—13 of the pipe line and to this end the outer extremity of each rod is bent at an angle to form a bracket-portion 34 which is permanently secured by welding or similar fastening means to the upper face and adjacent one edge of the cap 17 of one of the sealed pressure responsive means 13.

From the foregoing description and drawings, it will be clear that the rigid H-frame unites the two sealed pressure responsive means 13—13 and the d/P cell 29 in the form of a single integrated unit which may be readily connected to the pipe taps of a pipe line with a fluid tight connection by the simple expedient of bolting the flanges of the pipe taps to the caps 17 of the pressure responsive means 13.

Figure 4:
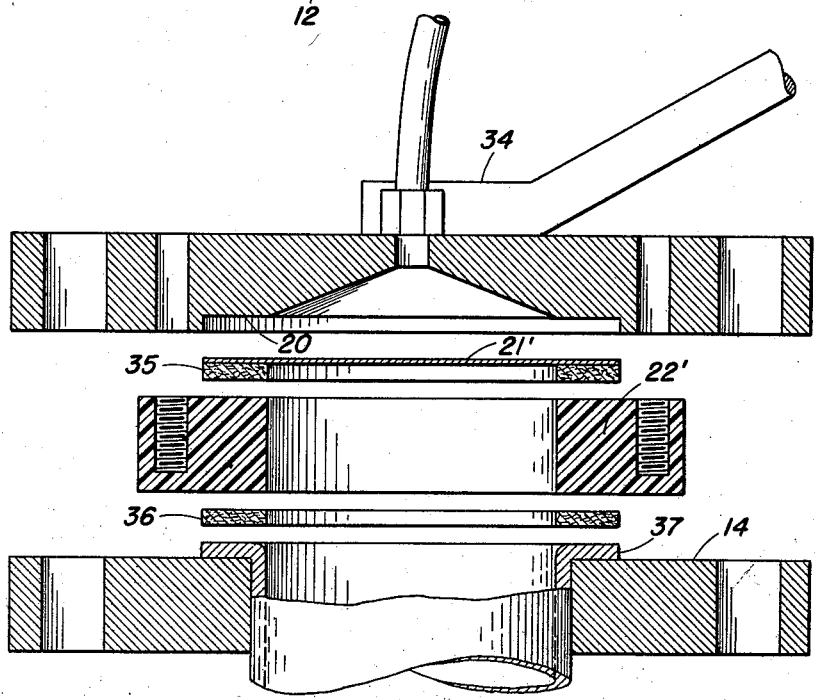
FIG. 4 is an enlarged elevation in section of a modified form of fluid pressure responsive means of the unit of this invention.

A modification of the sealed pressure responsive means is shown in FIG. 4. In this embodiment of the invention the fluid tight joints between the diaphragm 21, the retainer ring 22' and the pipe cap flange 14 are formed by using separate ring-gaskets 35 and 36 respectively each formed of a corrosion resistant material such as neoprene, Teflon or similar plastic materials. The retaining ring 22' is, in this case, formed with smooth faces on which the gaskets are adapted to seat. It will be noted too that the flange 14 of the pipe tap is not secured to the top of the pipe tap, as in the embodiment shown in FIG. 3, but to the underside of an annular lip 37 formed on the upper end of the pipe tap—the ring gasket 36 being adapted to seat on the tap lip 37. In other respects the modified seal pressure responsive means shown in FIG. 4 is similar to the responsive means shown in FIG. 3.

The concept of constructing the d/P cell and the sealed pressure responsive means 13—13 as a self-contained sealed differential pressure measuring unit which may be readily manipulated as a unit has overcome the vexing problems caused by the presence, in prior art metering devices, of air and/or air pockets in the fluid pressure transmitting system. By constructing the sealed pressure responsive means 13—13 and the d/P cell as an integrated unit, it is possible to manipulate the unit manually and independently of the pipe line prior to installation whereby it is possible to remove all inclusions of air from the fluid pressure measuring system and thus to provide highly accurate measurements of the fluid flow in a pipe line. Thus, in assembling a unit for use on a pipe line and before the diaphragms and diaphragm retaining rings have been secured in place, the unit is mounted in an inverted position in a jig or other temporary supporting means, and while in its inverted position hydraulic brake fluid is slowly poured into the conical recesses of the respective caps 17 until each recess is completely filled. The face of each diaphragm is then wetted with the brake fluid on the side opposite the retaining ring and floated on the fluid surface of its respective recess. The plastic retaining ring of each diaphragm is then put in place and bolted to its respective cap. Thereupon the entire unit is removed from the jig and manipulated, i.e. alternately, righted and inverted several times and also turned to a position such that the faces of the sealed pressure responsive means 13—13 are in a generally vertical plane such that any air in the fluid system in the unit can escape from those portions of the d/P cell in which air is prone to be trapped during filling. After venting both sides of the d/P cell in this manner the unit is replaced in its inverted position in the jig, the diaphragm retaining rings and diaphragms are removed and additional fluid is added to again fill the recesses of the respective caps. The diaphragm and retaining rings are again replaced and the unit again manipulated, this procedure being repeated until all air has been removed from the system as indicated by the absence of air bubbles beneath the diaphragms.

The metering unit is now ready for installation which is effected simply by aligning the bolt holes and caps 17 with the bolt holes of the pipe cap flanges and securing the bolts in the aligned holes. The usual air connection (not shown) is made to the d/P cell and recorder and the output of the cell adjusted for zero flow.

From the foregoing description and the drawings, it is evident that the sealed differential pressure measuring means of this invention is a single integrated unit which is leak proof over long periods of operation and has a sealed fluid pressure measuring system which is free of air or air pockets, and hence accurately measures the flow of fluid in a pipe line—the unit being so constructed as to be readily mounted and removed from the pipe taps of the pipe line.

While this invention has been described and illustrated by the examples shown, it is not intended to be strictly limited thereto, and other variations and modifications may be employed within the scope of the following claims.

I claim:

1. A sealed, integrated differential pressure metering unit for measuring the pressure of a fluid in a pipe line having pipe taps and an orifice between said pipe taps said metering unit comprising in combination: a pair of sealed pressure responsive means constructed and arranged to be detachably mounted on the respective pipe taps of a pipe line; a differential pressure measuring cell; tubular members constructed and arranged to connect said sealed pressure responsive means to said cell; an air-free fluid filling said sealed pressure responsive means, said tubular members, and said cell; and rigid connecting means constructed and arranged independently of said tubular members to permanently connect each of said sealed pressure responsive means to said cell to form an integrated unit.

2. A sealed, integrated differential pressure metering unit according to claim 1 wherein said rigid connecting means comprises a rigid frame, and fastening means permanently connecting each of said sealed pressure responsive means and said cell to said frame to form an integrated unit.

References Cited in the file of this patent

UNITED STATES PATENTS

| | | |
|---|---|---|
| 2,679,760 | Harland et al. | June 1, 1954 |
| 2,714,168 | Hencke et al. | July 26, 1955 |
| 2,963,906 | Bailey | Dec. 13, 1960 |
| 3,014,372 | Hallett | Dec. 26, 1961 |